US012710062B2

(12) United States Patent
Busani et al.

(10) Patent No.: US 12,710,062 B2
(45) Date of Patent: Aug. 18, 2026

(54) HYDRAULIC DISTRIBUTOR WITH PRESSURE COMPENSATOR FOR DIRECTIONAL VALVES

(71) Applicant: WALVOIL S.P.A., Reggio Emilia (IT)

(72) Inventors: Ulderico Busani, Reggio Emilia (IT); Davide Mesturini, Reggio Emilia (IT); Gianluca Ganassi, Reggio Emilia (IT); Mattia Scolari, Reggio Emilia (IT)

(73) Assignee: WALVOIL S.P.A., Reggio Emilia (IT)

( * ) Notice: Subject to any disclaimer, the term of this patent is extended or adjusted under 35 U.S.C. 154(b) by 33 days.

(21) Appl. No.: 17/723,801

(22) Filed: Apr. 19, 2022

(65) Prior Publication Data

US 2022/0373000 A1 Nov. 24, 2022

(30) Foreign Application Priority Data

Apr. 19, 2021 (IT) ........................ 102021000009830

(51) Int. Cl.
*F15B 13/04* (2006.01)
*F15B 11/16* (2006.01)

(52) U.S. Cl.
CPC ........ *F15B 13/0417* (2013.01); *F15B 11/163* (2013.01); *F15B 2211/30555* (2013.01); *F15B 2211/71* (2013.01)

(58) Field of Classification Search
CPC ...... F15B 2211/428; F15B 2211/50544; F15B 2211/52; F15B 2211/605; F15B 2211/635; F15B 2211/6355; F15B 2211/6658; F15B 2211/67; F15B 2211/68; F15B 2211/3055; F15B 2211/41554; F15B 13/026; F15B 13/0417
See application file for complete search history.

(56) References Cited

U.S. PATENT DOCUMENTS

| | | | | | |
|---|---|---|---|---|---|
| 3,866,419 | A * | 2/1975 | Paul | B66F 9/22 | 60/427 |
| 3,890,413 | A * | 6/1975 | Peterson | B30B 11/04 | 425/149 |
| 4,597,352 | A * | 7/1986 | Norminton | B63G 8/42 | 114/268 |

(Continued)

FOREIGN PATENT DOCUMENTS

| | | | |
|---|---|---|---|
| EP | 2891806 | A1 | 7/2015 |
| JP | H08121406 | A | 5/1996 |

(Continued)

*Primary Examiner* — Kelsey E Cary
(74) *Attorney, Agent, or Firm* — Carmel Patent Agency; Robert Ballarini

(57) ABSTRACT

A hydraulic distributor includes at least one main spool configured to define a delivery branch, and a discharge branch, a feed branch and a pressure compensator configured such that a local pressure acts on a first side thereof and a maximum Load Sensing pressure acts on a second side characterizing either the working pressure of the hydraulic section, in the case in which there is only one hydraulic section, or, in the case in which there is a plurality of hydraulic sections, each one defining a respective characteristic pressure, of the maximum pressure among the characteristic pressures of the hydraulic sections. The pressure compensator is arranged such as to respectively intercept said delivery branch and said discharge branch.

11 Claims, 4 Drawing Sheets

(56) References Cited

U.S. PATENT DOCUMENTS

| | | | | |
|---|---|---|---|---|
| 4,761,120 | A * | 8/1988 | Mayer | F04B 47/04 417/403 |
| 6,422,121 | B1 * | 7/2002 | Wysong | B65G 53/4633 91/356 |
| 6,854,270 | B2 | 2/2005 | Zenker | |
| 7,182,097 | B2 * | 2/2007 | Busani | F15B 13/0418 91/446 |
| 7,219,593 | B2 * | 5/2007 | Busani | F15B 11/165 91/518 |
| 8,375,975 | B2 * | 2/2013 | Busani | F15B 13/0402 91/446 |
| 8,720,580 | B1 * | 5/2014 | Lugo | E21B 21/001 166/347 |
| 9,033,051 | B1 * | 5/2015 | Lugo | E21B 33/064 166/344 |
| 9,038,728 | B1 * | 5/2015 | Lugo | E21B 33/064 166/347 |
| 9,045,959 | B1 * | 6/2015 | Lugo | E21B 33/038 |
| 9,080,411 | B1 * | 7/2015 | Lugo | E21B 33/064 |
| 9,140,091 | B1 * | 9/2015 | Cox | B66C 13/08 |
| 9,670,755 | B1 * | 6/2017 | Lugo | E21B 33/064 |
| 2003/0178200 | A1 * | 9/2003 | Fox | E21B 7/124 166/344 |
| 2005/0287017 | A1 * | 12/2005 | Busani | F15B 13/0417 417/393 |
| 2006/0037649 | A1 * | 2/2006 | Busani | F15B 13/0418 137/596 |
| 2008/0099086 | A1 * | 5/2008 | Costin | F15B 13/0402 137/596.12 |
| 2010/0047023 | A1 * | 2/2010 | Horne | F16L 1/265 285/146.1 |
| 2010/0176324 | A1 * | 7/2010 | Busani | F15B 13/0402 251/129.15 |
| 2010/0193198 | A1 * | 8/2010 | Murray | E21B 19/166 166/380 |
| 2010/0307760 | A1 * | 12/2010 | Shouse | E21B 33/072 166/339 |
| 2012/0318520 | A1 * | 12/2012 | Lugo | E21B 21/001 166/363 |
| 2013/0199170 | A1 * | 8/2013 | Neumann | F15B 11/024 60/384 |
| 2014/0060032 | A1 * | 3/2014 | Pfaff | E02F 9/2292 60/422 |
| 2015/0060081 | A1 * | 3/2015 | Cox | E21B 33/064 166/368 |
| 2015/0361998 | A1 * | 12/2015 | Rantanen | F15B 21/14 60/413 |
| 2017/0350210 | A1 * | 12/2017 | Lugo | E21B 33/063 |
| 2018/0045185 | A1 * | 2/2018 | Draper | F04B 1/324 |
| 2018/0216317 | A1 * | 8/2018 | White | F15B 21/14 |
| 2022/0163992 | A1 * | 5/2022 | Cervi | G05G 5/26 |

FOREIGN PATENT DOCUMENTS

| | | | |
|---|---|---|---|
| JP | H11311204 | A | 11/1999 |
| JP | 2007177948 | A | 7/2007 |

* cited by examiner

HYDRAULIC DISTRIBUTOR WITH PRESSURE COMPENSATOR FOR DIRECTIONAL VALVES

FIELD OF APPLICATION

The present invention finds application in hydraulic systems, particularly but not exclusively in mobile operating machines.

Within this sector, the invention refers to a hydraulic distributor of the type comprising at least one spool valve for actuating a hydraulic device, e.g., a hydraulic actuator, and a pressure compensator.

BACKGROUND

In the field of the hydraulic distributors, the purpose of pressure compensation is to maintain a constant pressure drop at the ends of the adjustment ports, thus enabling a precise flow rate control to be implemented, independent of the actuator load and of the simultaneous operation of several sections, so that the adjusted flow rate is a function only of the stroke of the main spool valve. The hydraulic distributors that implement this type of control are called load sensing.

There are numerous ways of implementing the load sensing distributors, with particular regard to the position of the pressure compensator inside the circuit.

The most widespread types on the market provide for the positioning of the compensator on the delivery line to the section. The compensator can be placed immediately downstream of the main adjustment spool on the delivery line to the section. This construction solution is particularly simple and compact, but has two major drawbacks.

In fact, in the presence of dragging loads, an optimal flow rate control is not guaranteed and it is not effectively suitable for the realization of hydraulic circuits provided with energy recovery systems.

An alternative solution, which is less widespread on the market, is represented by load sensing distributors in which the pressure compensator is placed on the discharge branch, at the outlet of the section. Examples of such solutions are described in the Japanese patents JPH11311204A and JPH08121406A, which describe some possible configurations of hydraulic circuits provided with compensators placed on the discharge branch of the distributor, although inserted within a circuit that does not include a load sensing pump.

This type of distributor, compared to the previous ones, offers the possibility of controlling the flow rate in the presence of dragging loads, however it also has two major drawbacks.

Firstly, it tends in fact to raise the working pressures in the actuator chambers. It will in fact be appreciated that in the presence of a dragging load applied on the stem side of an actuator, combined together with a high system pressure acting on the bottom side of the same actuator, it can bring the pressure on the discharge branch to very high values. Under certain load conditions, these values can prove fatal for common hydraulic components.

Patent JP2007177948A seeks to remedy this problem of increased pressure, but it does so by creating an oil escape passageway that can have important negative consequences in terms of flow rate control.

A second possible drawback relates to the stability of the movement. It is in fact intuitive to use pressure signals taken on the delivery line for flow rate control purposes, while compensation takes place on the discharge branch. The distance of these pressure references and the entire elasticity of the section circuit can limit the damping capacity of the system and accentuate the oscillating phenomena.

SUMMARY OF THE INVENTION

The technical problem at the basis of the present invention is to make available a hydraulic circuit that is structurally and functionally conceived to overcome, at least in part, one or more of the limitations disclosed above with reference to the mentioned prior art.

In the context of this technical problem, one object of the present invention is to make available to the art a hydraulic distributor that is set up for simple use in applications provided with energy recovery logic.

A further object is to make available a hydraulic distributor that is able to avoid or at least reduce the risk of working situations in which excessive pressure conditions can occur, potentially capable of damaging the hydraulic components used.

Still another object of the invention is to make available a hydraulic distributor in which it is possible to optimize the flow rate control in different working situations, limiting the oscillating phenomena that can occur during the use of the distributor.

These and other objects are achieved thanks to one or more of the features of the invention set forth herein.

It will be observed that the hydraulic distributor of the present invention provides for the presence of a pressure compensator on one side of which a local pressure-taken at a section of the main delivery line-acts and a pressure corresponding to the maximum load sensing pressure-being the maximum pressure among the characteristic pressures of the hydraulic sections actuated by the distributor-acts on a second side. In the event that there is a single working section, and therefore a single hydraulic section, this pressure is representative of the pressure at which the section works. If there are more than one working section and corresponding sections, the pressure on the second side of the compensator will be characteristic of the working section at the maximum pressure.

The pressure compensator is also arranged such as to intercept both the delivery line and the discharge line.

In this way, the pressure compensator can act taking into account both the working conditions of the different sections actuated by the distributor and taking into account the delivery conditions.

Furthermore, during the operation of the distributor both branches can be intercepted simultaneously, therefore simultaneously choking both the delivery and the discharge depending on the different operating conditions.

The compensator can therefore act by fully opening the delivery and discharge ports or by choking them, depending on the working conditions of the distributor. For example, in the event that the maximum load sensing Pressure has a high value, for example due to the occurrence of a particular working condition, for example resulting from a high load being simultaneously actuated on another section, the compensator will tend to choke the passage ports, by acting on both the delivery and on the discharge such to bring the hydraulic system back to an equilibrium situation without significant oscillations in the flow rate deriving therefrom.

It will be appreciated that in the context of the present invention the term to choke is used to indicate a decrease in the extension of the passage ports.

A correct sizing and an appropriate timing of the opening ports defined by the stroke of the spool of the compensator, allow to optimize the operating conditions of a specific application, avoiding the typical contraindications of traditional systems.

According to a further aspect of the invention, the pressure compensator incorporates a continuous-positioning spool, precisely allowing a continuous and precise adjustment of the flow rate according to the actual working conditions.

In preferred embodiments, the pressure compensator comprises four ports, thereby enabling a particularly simple constructive solution to be realized. Preferably, the four ports comprise two inlet ports, respectively one for the delivery and one for the discharge, and two outlet ports, respectively one for the delivery and one for the discharge.

In some embodiments, the pressure compensator comprises a further passageway defining an energy recovery section that can be connected to an energy recovery device. It will be in fact appreciated that the characteristics of the distributor according to the present invention make it possible to obtain a structure that can be easily used in the event that an energy recovery logic is envisaged, through the adoption of the aforesaid further passageway.

Preferably the further passageway is a further outlet passageway and is connected to the discharge branch. Thanks to the presence of this further passageway, it is possible to send the fluid coming from the discharge branch to the tank, or have it flow towards an energy recovery device depending on the operating conditions of the compensator. The fluid flow rate may be directed to the discharge or, if the working conditions permit, partly or wholly to a recovery device by partializing or closing the discharge section.

Preferably, in order to keep the compensator normally open, it may comprise an elastic element, for example a spring, acting on the first side.

According to a further aspect of the invention, the pressure compensator comprises respective ports for the delivery line and the discharge line, said ports being configured such to define a passage port of the delivery line and a passage port on the discharge branch, the passage port of the delivery line and/or of the discharge branch being chokeable according to the displacement of the continuous-positioning spool of the pressure compensator.

This makes it possible to advantageously achieve different compensation configurations, simply by intervening on the geometric characteristics of the passage ports.

Preferably, the ports are configured such that a passage port is defined on the discharge line smaller than a passage port defined on the delivery line.

Thanks to this feature, it is possible to obtain a predominant compensation on the discharge line, while providing for a compensation on the delivery line that can help reduce the undesirable effects of increased pressures and instability of the system.

According to yet another aspect, the local pressure is taken at a primary section of the delivery line immediately downstream of the spool. Preferably, the primary section connects the spool with the pressure compensator. The delivery line can also comprise a secondary section that again places the compensator in communication with the spool. This allows to optimize the overall dimensions of the distributor, simplifying the design thereof.

In preferred embodiments, the compensator is arranged downstream, and preferably immediately downstream, of the main spool valve along the delivery section.

According to a further aspect, the compensator is arranged downstream, and preferably immediately downstream, of the main spool valve along the discharge section.

It will be appreciated that in the context of the present invention the term immediately downstream will be used to indicate that there are no further hydraulic components between the main spool valve and the compensator.

According to a further aspect, the invention also refers to a method for actuating a hydraulic device through a distributor comprising one or more of the aforementioned features.

The method involves supplying an operating fluid flow rate at a working pressure to the delivery line, for actuating the hydraulic section, and choking, through the pressure compensator, the delivery line and the discharge line at the same time, preferably according to the different operating conditions.

Preferably, the method involves choking more the discharge line than the delivery branch.

According to yet another aspect, the invention also refers to a hydraulic system comprising a feed group, a distributor and one or more hydraulic devices.

The distributor preferably comprises one or more of the features previously illustrated or in general indicated in the claims.

Preferably the hydraulic system may further comprise an energy recovery device.

Preferred embodiments illustrated both above and below in relation to a single aspect are equivalently applicable also to the further aspects of the present invention, in particular to the two further aspects defined above.

Said objects and advantages are all achieved by the hydraulic circuit, being the subject-matter of the present invention, which is characterized by the provisions of the claims below.

BRIEF DESCRIPTION OF THE DRAWINGS

This and other features will be more apparent from the following description of some embodiments illustrated purely by way of example in the accompanying drawings, in which.

DETAILED DESCRIPTION OF THE PREFERRED EMBODIMENTS

Figure 1:
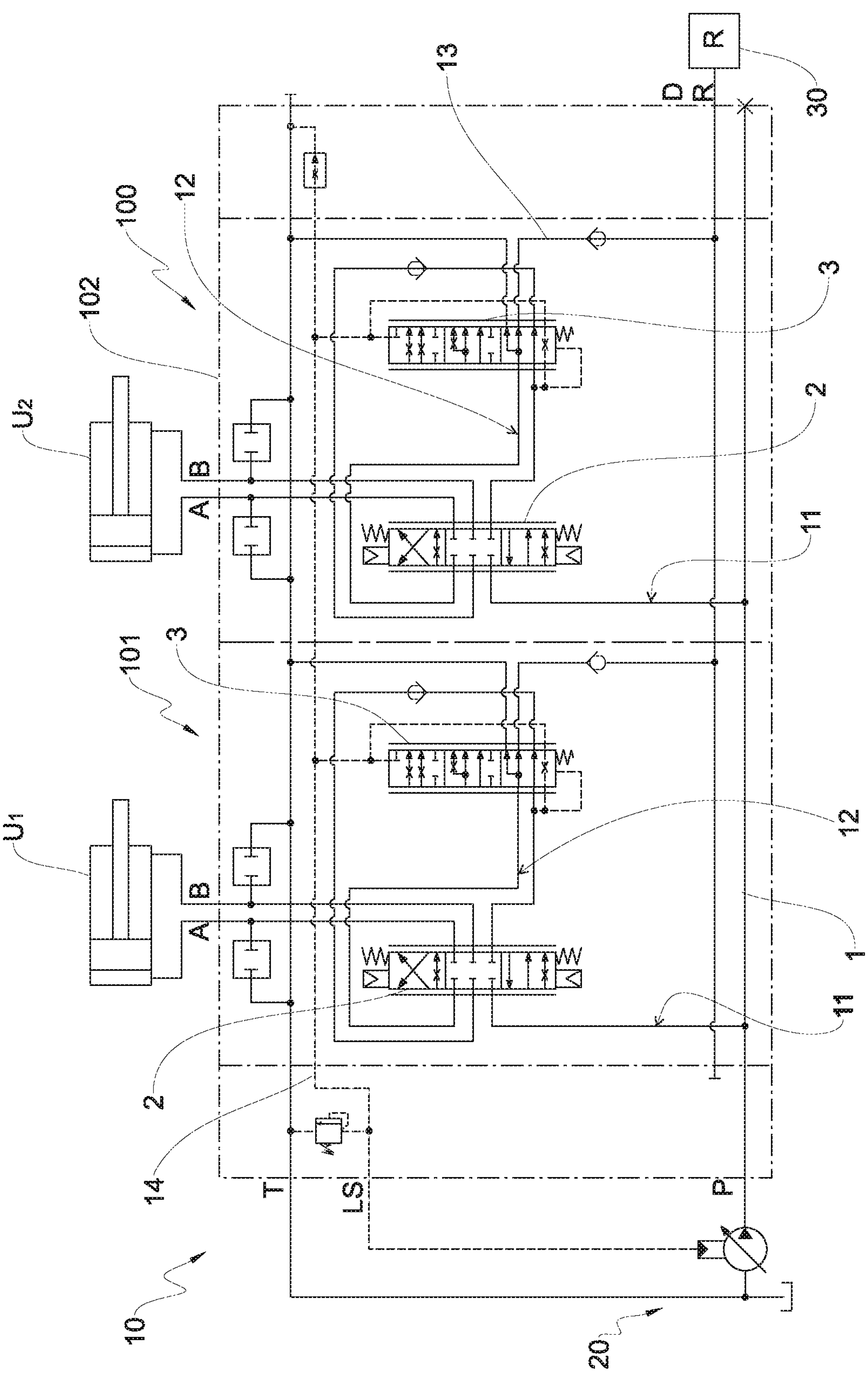
FIG. 1 is a schematic illustration of a hydraulic distributor according to the present invention in an exemplary embodiment in which two working sections are provided.

Referring initially to FIG. 1, a hydraulic system comprising a hydraulic distributor 100 according to the present invention is illustrated as a whole with the number 10.

The hydraulic system 10 is intended to actuate one or more hydraulic devices U1, U2, . . . , Un and comprises a feed group 20 intended to supply a flow rate of operating fluid for actuating these hydraulic devices.

The feed group 20 may be of the variable flow rate or pressure type, like in the embodiment example illustrated in the figure. However, solutions may be provided in which other solutions for adjusting the feed group 20 may be used.

In some embodiments, the feed group 20 may comprise a variable displacement pump that adjusts the flow rate based on the pressure characteristic of the higher pressure section among those fed by the feed group. The example in FIG. 1 illustrates the hydraulic system 10 in the case where the feed group 20 is intended to feed two hydraulic devices U1, U2. It should be noted that there can still be an even larger number of sections, as indicated above.

In the example represented in FIG. 1, the two devices U1, U2, are for example formed by double-acting hydraulic actuators. The hydraulic device U1 can however be represented by the actuation of any other hydraulic equipment. It will in fact be appreciated that the same inventive concepts set forth in connection with the present invention are also applicable to other solutions, like a hydraulic motor. For this reason, hereafter the term "hydraulic device" will be used to refer to any hydraulic equipment intended to be actuated by means of a hydraulic circuit with one or more working sections.

The feed group 20 is intended to supply the fluid required for the actuation of these actuators, which is supplied to them by means of the distributor 100. In the hydraulic system 10, a direct tank branch is also defined, generically denoted by T, in which the operating fluid being discharged from the sections flows.

In preferred embodiments, an energy recovery device 30 is also provided towards which the distributor 100 can direct part of the operating fluid in ways that will be described in more detail below.

Still with reference to the example illustrated in FIG. 1, the distributor 100 comprises a feed line 1 connected to the feed group 20 and through which the fluid flow rate is directed to the individual sections of the distributor 100.

It will be appreciated that the distributor 100 may have a plurality of working sections 101, each one intended to actuate a respective hydraulic device U1, . . . , Un.

In the embodiment illustrated in FIG. 1, the distributor 100 comprises two working sections 101, 102, connected to a respective actuator or more generally to a respective hydraulic device U1, U2.

Preferably, each of the sections 101, 102 comprises a spool valve 2 or hereafter denoted simply as "spool", which is clearly understood by one of ordinary skill in the art, for actuating the hydraulic device U1, U2 and a pressure compensator 3, the operating characteristics of which will be better illustrated below.

Figure 2:
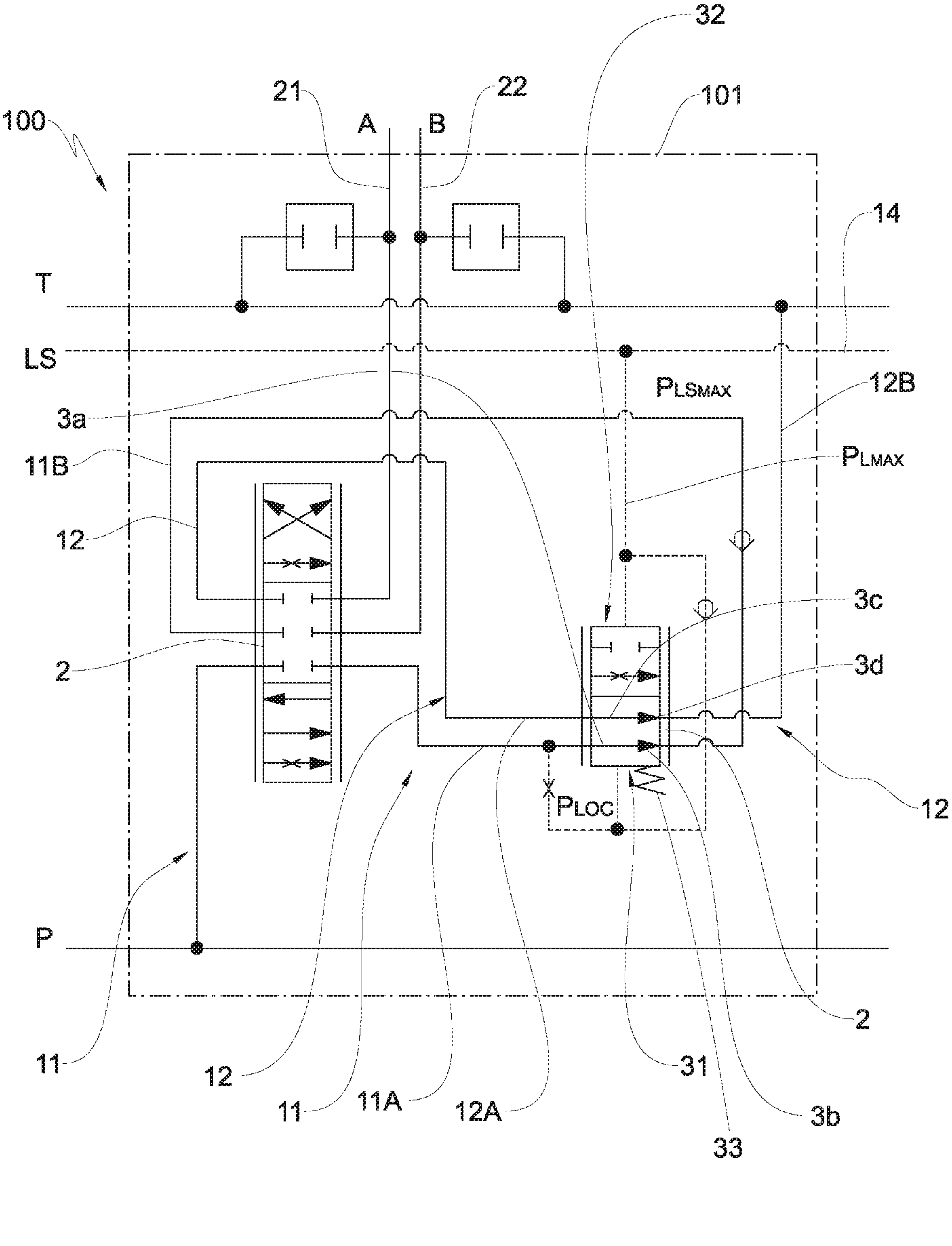
FIG. 2 is a schematic illustration of a hydraulic distributor according to an exemplary embodiment in which a single working section is present and energy recovery logics are not used.

For the sake of illustrative simplicity, the invention will still be illustrated below in the case of a single section 101, like in the example of FIG. 2. Again, for the sake of greater illustrative simplicity, in the embodiment example of the figure there are no energy recovery functions.

As can be observed, the spool 2 defines a delivery line 11, connected to the feed line 1, and a discharge line 12, connected to the discharge T.

Preferably, the spool 2 intercepts the delivery line 11 defining a primary section 11A that connects the spool 2 to the pressure compensator 3.

As will be better illustrated below, compensator 3 is intended to compensate for the pressures present in the system as a function of the position of a continuous-positioning spool thereof.

According to some embodiments, the pressure compensator 3 is of the four-way type.

A first port 3*a* and a second port 3*b* intercept the delivery line 11. The first port3*a* is in particular connected to the primary section 11A, while the second port is connected to a secondary section 11B of the delivery line 11, which brings the flow rate of operating fluid back to the main spool 2 after passing through the compensator 3.

This flow rate of operating fluid can then be sent to the hydraulic section Un, by actuating it in one direction or in the opposite one depending on the position of the main spool 2. For this purpose, a first connection section 21 and a second connection section 22 can be provided in the section 101, to which the spool 2 sends the flow rate supplied by the secondary section 11B, or more generally by the delivery line 11, depending on the positioning of the spool 2.

During the actuation of the hydraulic device, one between the first and the second connection line supplies the flow rate of fluid in delivery and the other receives the fluid in discharge once the required hydraulic work has been performed.

This fluid is again passed in the spool 2 which sends it to the discharge line 12 of the section.

The discharge line 12 is also intercepted at the outlet of the spool 2 by the compensator 3. Therefore, two further ports 3*c* and 3*d* of the compensator are connected to the discharge line 12, defining a main section of the discharge line 12A, which connects the spool 2 to the compensator 3, and an auxiliary section 12B, which connects the compensator to the discharge T.

As previously illustrated, the compensator 3 allows to choke the passage of the fluid both in the delivery and in the discharge.

In other words, the ports 3*a*, 3*b*, 3*c*, 3*d* are configured such to define a passage port of the delivery line and a passage port of the discharge line.

Advantageously, the passage of fluid is choked simultaneously at the delivery and discharge.

These passage ports can be choked according to the stroke of the spool of the compensator 3.

Figure 4A:
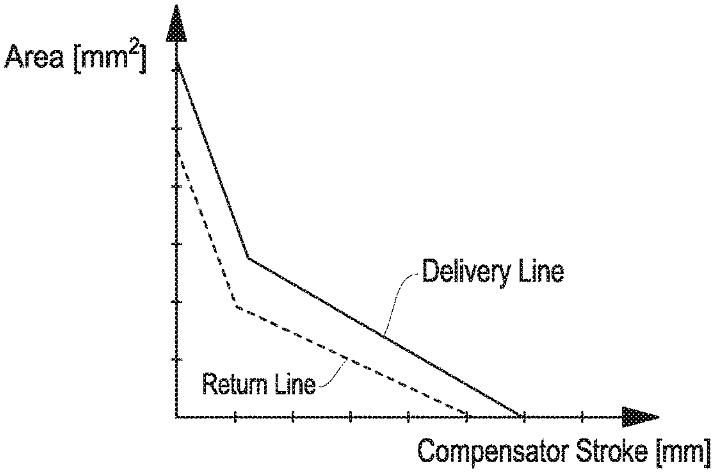
FIGS. 4*a*, 4*b*, 4*c* are graphs illustrating the ratio between the stroke of the compensator and the ports surface of the compensator in different configurations of the compensator.
Figure 4B:
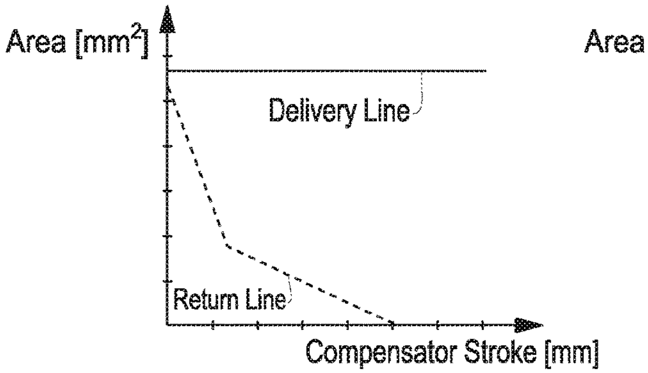
Figure 4C:
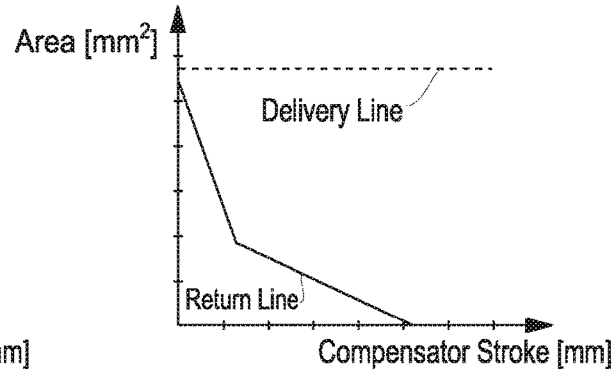

In this regard, FIGS. 4A, 4B and 4C illustrate the variation of the surface of the passage ports as a function of the stroke of the spool of the compensator in various embodiments.

In a preferred embodiment, schematically shown in FIG. 4A, the ports 3*a*, 3*b*, 3*c*, 3*d* are configured such that the passage port on the discharge line 13 is smaller than said passage port defined on the delivery line 11.

In this case, assuming that the delivery and discharge flow rates are the same (section/actuator with equal areas), the compensation will mainly occur on the discharge line, but the portion of compensation on the delivery line can help reduce the undesirable effects of increased pressures and system instability.

Different sizings of the ports advantageously allow to obtain different behaviors in the compensator and in general in the system.

FIGS. 4B and 4C illustrate in fact the borderline cases in which the variation of the port on the delivery line is respectively eliminated or the variation of the port on the discharge line is completely eliminated. It will therefore be appreciated that the system of the present invention allows by means of simple structural modifications to achieve different operational solutions, thus providing a high degree of versatility.

In order to achieve the compensation required by the system, the pressure compensator 3 is advantageously configured such that a local pressure Ploc taken at the delivery line 11 acts on the first side 31 thereof and a maximum load sensing pressure PLSmax acts on the second side 32, opposite to the first side 31.

Preferably, the local pressure PLoc is taken at a primary section 11A of the delivery line 11 located downstream of said spool 2 and upstream of said pressure compensator 3. Preferably the pressure is taken immediately upstream of the compensator 3, i.e. there are no hydraulic components interposed between the point where the pressure PLoc is taken and the compensator 3.

In some embodiments, a spring, or other equivalent elastic element 33 further acts on the side 31 in addition to the local pressure PLoc.

With regard to the pressure PLSmax, in the case in question, in which there is only one hydraulic section, this pressure corresponds to the pressure characteristic of the working pressure of the hydraulic device U1. On the other hand, in the case in which there is a plurality of hydraulic devices U1, . . . . Un, the pressure PLSmax corresponds to the maximum load sensing pressure among all those characterizing the hydraulic devices present. This pressure is taken at a load sensing line 14 which supplies the load sensing signal to the feed group 20.

In this regard, it will be appreciated that in the context of the present invention, the term load sensing pressure is used to indicate the characteristic pressure value of each section which is sent to the feed group 20 to adjust the flow rate in the system, e.g. by adjusting the pump displacement.

Therefore, the maximum load sensing pressure determined by the operating conditions of each device U1, . . . , Un acts on the side 32.

Thanks to this configuration, the compensator 3 can therefore make a continuous adjustment based on the actual operating conditions of the system, shifting the spool, and thus compensating for the flow rates, so as to maintain the system in a condition of dynamic equilibrium.

Figure 3:
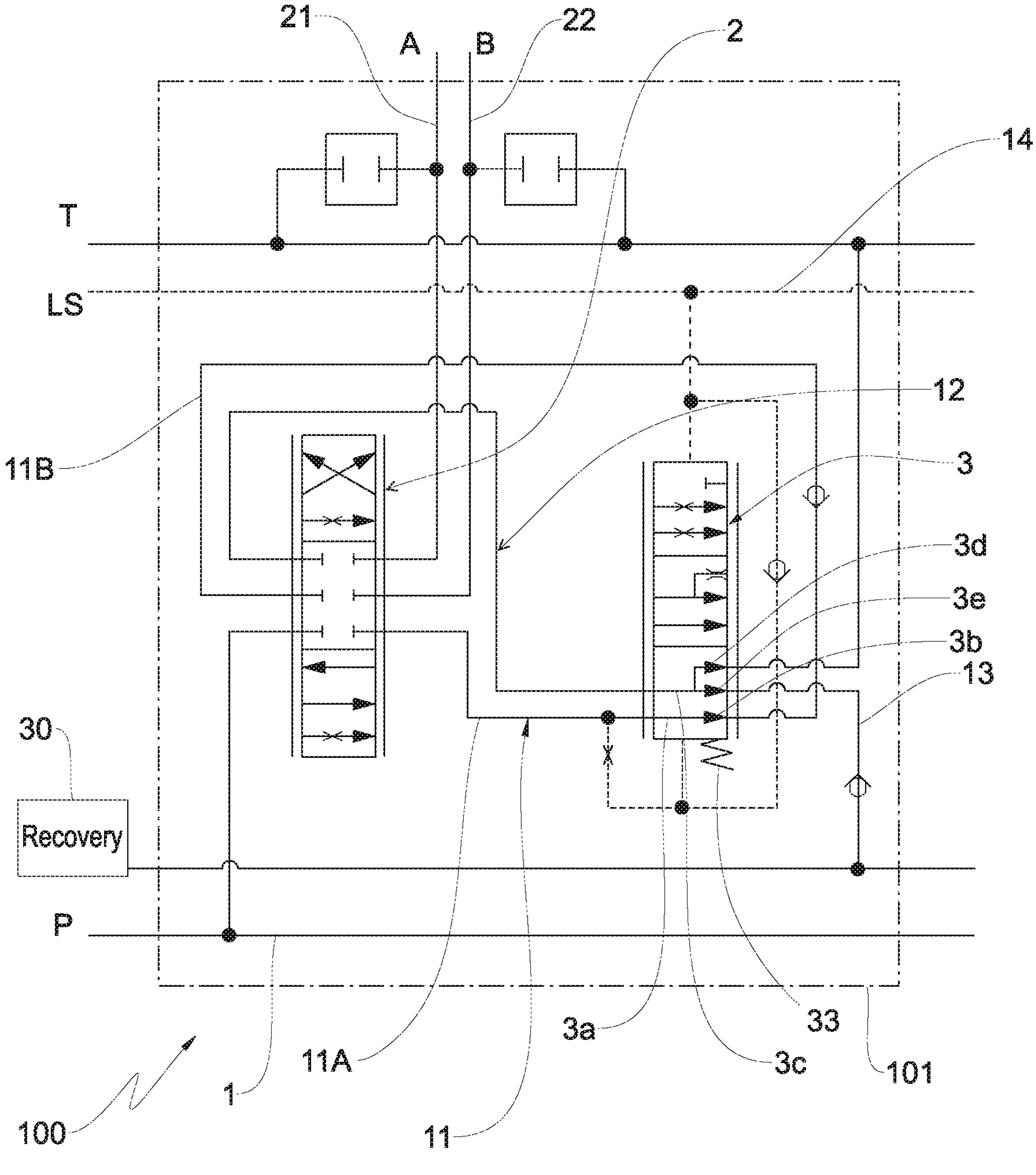
FIG. 3 is a schematic illustration of a hydraulic distributor according to a further exemplary embodiment in which a single working section is present and an energy recovery function is provided.

An alternative embodiment of the distributor of the present invention is represented in FIG. 3.

In such embodiments, the energy recovery function is further envisaged in the system.

For this purpose, the pressure compensator 3 comprises a further way 3*e* configured so as to connect the discharge section 12 with an energy recovery section 13 that can be connected to the energy recovery device 30.

Depending on the operating conditions, the operating fluid may be sent to the discharge T or to the energy recovery device 30.

These conditions are transmitted to the compensator by means of the pressures PLoc and PLSmax, which will move into a position such as to open, partialize or close the further port 3*e* if the flow rate and pressure conditions are suitable to allow an energy recovery. For example, in the case of a dragging load acting on the hydraulic device, the difference between PLoc and PLSmax is likely to be such that the spool of the compensator is shifted so that the port towards the discharge is closed and the flow is partially or entirely diverted towards the recovery device 30.

It will be appreciated that although such an energy recovery solution has been described in relation to a single section it will be possible to apply these concepts also to other embodiments, for example formed by a plurality of sections.

It will therefore be appreciated that the circuit of the present invention allows the compensation and energy recovery functions to be realized effectively, with a high degree of versatility and efficiency in handling the different operating conditions.

The invention claimed is:

1. Hydraulic distributor comprising:

a main spool valve for actuating a hydraulic device, said main spool valve defining a delivery line and a discharge line;

a feed line supplying a flow rate of an operating fluid at a working pressure to the delivery line for actuating the hydraulic device;

a pressure compensator comparing a local pressure signal taken at the delivery line and a maximum load sensing pressure signal representing the working pressure of said hydraulic device, wherein said pressure compensator intercepts said delivery line and said discharge line, and wherein said local pressure is taken at a primary section of the delivery line located downstream of said main spool valve and upstream of said pressure compensator.

2. The hydraulic distributor according to claim 1, wherein both said delivery line and said discharge line are simultaneously intercepted by said pressure compensator.

3. The hydraulic distributor according to claim 1, wherein said pressure compensator comprises four ports, two of the four ports defining a flow path for the delivery line and the other two of the four ports defining a flow path for the discharge line.

4. The hydraulic distributor according to claim 3, wherein the flow path for the discharge line has a smaller section than the flow path for the delivery line.

5. The hydraulic distributor according to claim 1, wherein said pressure compensator comprises a spring proving an additional force to the local pressure signal acting on a first side of the pressure compensator.

6. The hydraulic distributor according to claim 1, wherein said delivery line comprises a secondary section further connecting said pressure compensator with said main spool valve, said pressure compensator being interposed between said primary section and said secondary section.

7. Hydraulic distributor comprising:

a main spool valve for actuating a hydraulic device, said main spool valve defining a delivery line and a discharge line;

a feed line supplying a flow rate of an operating fluid at a working pressure to the delivery line for actuating the hydraulic device;

a pressure compensator comparing a local pressure signal taken at the delivery line and a maximum load sensing pressure signal representing the working pressure of said hydraulic device, wherein said pressure compensator intercepts said delivery line and said discharge line, wherein said pressure compensator is arranged immediately downstream of said main spool valve along said delivery line and along said discharge line.

8. Hydraulic distributor comprising:

a main spool valve for actuating a hydraulic device, said main spool valve defining a delivery line and a discharge line;

a feed line supplying a flow rate of an operating fluid at a working pressure to the delivery line for actuating the hydraulic device;

a pressure compensator comparing a local pressure signal taken at the delivery line and a maximum load sensing pressure signal representing the working pressure of said hydraulic device, wherein said pressure compensator comprises five ports, two ports defining a flow path for the delivery line, two further ports defining a flow path for the discharge line and a fifth port connecting the flow path for the discharge line with an energy recovery line and wherein said pressure compensator intercepts said delivery line by the flow path for the delivery line and intercepts said discharge line by the flow path for the discharge line.

9. The hydraulic distributor according to claim 8, wherein said pressure compensator is arranged immediately downstream of said main spool valve along said delivery line and along said discharge line.

10. The hydraulic distributor according to claim 8, wherein said pressure compensator simultaneously intercepts both said delivery line and said discharge line.

11. Hydraulic distributor comprising:

a plurality of main spool valves each actuating a respective hydraulic device, each main spool valve defining a delivery line and a discharge line;

a feed line supplying a flow rate of an operating fluid at a working pressure to the delivery line for actuating the hydraulic devices;

a pressure compensator comprising four ports, two of the four ports defining a flow path for the delivery line and two of the four ports defining a flow path for the discharge line, wherein the pressure compensator compares a local pressure taken at the delivery line and a maximum load sensing pressure signal, said maximum load sensing pressure signal representing a maximum pressure value among respective working pressures of the hydraulic devices, an energy recovery line, wherein said pressure compensator intercepts simultaneously said delivery line and said discharge line.

* * * * *